United States Patent
Ding et al.

(10) Patent No.: US 6,297,322 B1
(45) Date of Patent: *Oct. 2, 2001

(54) CYCLOOLEFIN BLENDS AND METHOD FOR SOLVENT BONDING POLYOLEFINS

(75) Inventors: Yuan-pang Samuel Ding, Vernon Hills; Chuan Qin, Gurnee; Lecon Woo, Libertyville; Michael T. K. Ling; Sherwin Shang, both of Vernon Hills; Tahua Yang, Darien, all of IL (US)

(73) Assignee: Baxter International Inc., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/393,051

(22) Filed: Sep. 9, 1999

(51) Int. Cl.⁷ ................................ A61F 2/00; A61B 1/00; A61B 19/00; A61B 17/08

(52) U.S. Cl. ..................... 525/191; 525/191; 525/210; 525/211; 525/240; 600/29; 600/139; 604/403; 606/151; 606/152; 606/153

(58) Field of Search ............................ 523/105; 525/191, 525/210, 211, 240; 600/29, 139; 604/403; 606/151, 152, 153

(56) References Cited

U.S. PATENT DOCUMENTS

| | | |
|---|---|---|
| 3,494,897 | 2/1970 | Reding et al. . |
| 4,573,994 | 3/1986 | Fischell et al. . |
| 4,628,969 | 12/1986 | Jurgens, Jr. et al. . |
| 4,992,511 | 2/1991 | Yamamoto et al. . |
| 5,003,019 | 3/1991 | Ishimaru et al. . |
| 5,008,356 | 4/1991 | Ishimaru et al. . |
| 5,087,677 | 2/1992 | Brekner et al. . |
| 5,207,983 | 5/1993 | Liebert et al. . |
| 5,218,049 | 6/1993 | Yamamoto et al. . |
| 5,272,235 | 12/1993 | Wakatsuru et al. . |

(List continued on next page.)

FOREIGN PATENT DOCUMENTS

| | | |
|---|---|---|
| 133411 | 1/1979 | (DE) . |
| 251 904 A3 | 12/1987 | (DE) . |
| 39 37 865 A1 | 6/1990 | (DE) . |
| 0 156 464 A1 | 10/1985 | (EP) . |
| 0 216 509 B1 | 8/1986 | (EP) . |
| 0 283 164 | 3/1988 | (EP) . |
| 0 291 208 | 4/1988 | (EP) . |
| 0 291 208 A2 | 11/1988 | (EP) . |
| 0 492 982 B1 | 12/1991 | (EP) . |
| 92306664.1-2102 | 7/1992 | (EP) . |

(List continued on next page.)

*Primary Examiner*—Nathan M. Nutter
(74) *Attorney, Agent, or Firm*—Mark J. Buonaiuto; Joseph A. Fuchs

(57) ABSTRACT

The present invention provides a medical device of a polymer composition. The composition has a first component obtained by copolymerizing a norbornene monomer and an ethylene monomer, the first component being in an amount from about 1–99% by weight of the composition; and a second component of an ethylene and α-olefin copolymer, the α-olefin having 6 carbons, the second component being in an amount from about 99% to about 1% by weight of the composition.

40 Claims, 1 Drawing Sheet

U.S. PATENT DOCUMENTS

| | | |
|---|---|---|
| 5,288,560 | 2/1994 | Sudo et al. . |
| 5,331,057 | 7/1994 | Brekner et al. . |
| 5,359,001 | 10/1994 | Epple et al. . |
| 5,422,409 | 6/1995 | Brekner et al. . |
| 5,457,249 | 10/1995 | Toshihiro et al. . |
| 5,475,060 | 12/1995 | Brekner et al. . |
| 5,498,677 | 3/1996 | Wellner et al. . |
| 5,534,606 | 7/1996 | Bennett et al. . |
| 5,552,504 | 9/1996 | Bennett et al. . |
| 5,583,192 | 12/1996 | Bennett et al. . |
| 5,610,253 | 3/1997 | Hatke et al. . |
| 5,620,425 | 4/1997 | Heffernan et al. . |
| 5,629,398 | 5/1997 | Okamoto et al. . |
| 5,637,100 | 6/1997 | Sudo . |
| 5,637,400 | 6/1997 | Brekner et al. . |
| 5,650,471 | 7/1997 | Abe et al. . |
| 5,693,728 | 12/1997 | Okamoto et al. . |
| 5,698,645 | 12/1997 | Weller et al. . |
| 5,723,189 | 3/1998 | Sudo . |
| 5,733,991 | 3/1998 | Rohrmann et al. . |
| 5,744,664 | 4/1998 | Brekner et al. . |
| 5,788,670 | 8/1998 | Reinhard et al. . |
| 5,792,824 | 8/1998 | Natori . |
| 5,795,945 | 8/1998 | Natori . |
| 5,854,349 | 12/1998 | Abe et al. . |
| 5,863,986 | 1/1999 | Herrmann-Schönherr et al. . |
| 5,980,495 | 11/1999 | Heinz et al. . |
| 6,007,520 | 12/1999 | Sudo . |
| 6,065,270 | 5/2000 | Reinhard et al. . |
| 6,068,936 | 5/2000 | Peiffer et al. . |
| 0 384 694 B1 | 9/1996 | (EP) . |
| 0 497 567 B1 | 9/1996 | (EP) . |
| 0 790 063 A1 | 8/1997 | (EP) . |
| 03095286 | 4/1991 | (JP) . |
| 05277154 | 10/1993 | (JP) . |
| 11071554 | 3/1999 | (JP) . |
| WO 97/08054 | 3/1997 | (WO) . |
| WO 98/27926 | 7/1998 | (WO) . |
| WO 98/44043 | 10/1998 | (WO) . |
| WO 99/48990 | 9/1999 | (WO) . |

FOREIGN PATENT DOCUMENTS

| | | |
|---|---|---|
| 0 524 802 A1 | 1/1993 | (EP) . |
| 0 582 355 B1 | 2/1994 | (EP) . |
| 0 680 401 B1 | 11/1995 | (EP) . |
| 0 430 585 B1 | 1/1996 | (EP) . |
| 0 156 464 B1 | 5/1996 | (EP) . |
| 0 709 105 A1 | 5/1996 | (EP) . |
| 0 203 799 B1 | 8/1996 | (EP) . |

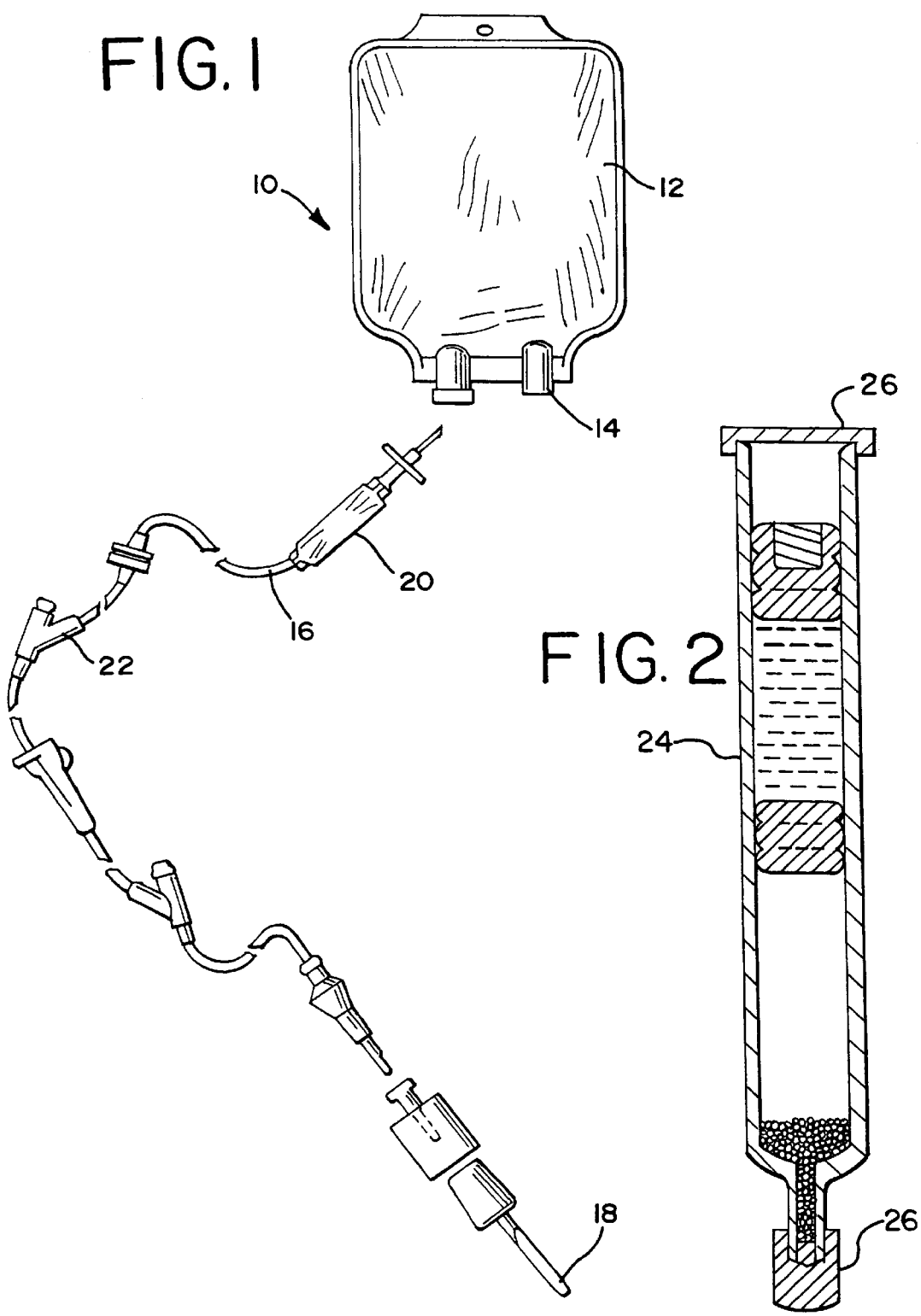

US 6,297,322 B1

CYCLOOLEFIN BLENDS AND METHOD FOR SOLVENT BONDING POLYOLEFINS

TECHNICAL FIELD

This invention relates to medical devices of polymer blends and more particularly to medical devices cyclic olefin containing polymers or bridged polycyclic hydrocarbon containing polymers blended with ethylene and α-olefin copolymers that are obtained utilizing a metallocene catalyst system.

BACKGROUND ART

In the medical field, where beneficial agents are collected, processed and stored in containers, transported and ultimately delivered through drip chambers, tube connectors and tubes by infusion to patients, there has been a recent trend toward developing materials useful for fabricating such containers, tubings and devices without the disadvantages of currently used materials such as polyvinyl chloride. These new materials must have a unique combination of properties to be used in fluid administration sets. Among these are the materials in most instances must be optically clear, environmentally compatible, have sufficient yield strength and flexibility for flexible products and sufficient rigidity for rigid products, have a low quantity of low molecular weight additives, be capable of being solvent bonded to soft polyolefin medical products and be compatible with medical solutions.

It is desirable for medical products in an infusion delivery set to be optically transparent to allow for visual inspection of fluids therein.

It is also desirable that the medical materials be environmentally compatible as a great deal of medical products are disposed of in landfills and through incineration. Further benefits are realized by using a material which is thermoplastically recyclable.

For medical products that are disposed of by incineration, it is necessary to use a material that does not generate or minimizes the formation of by-products such as inorganic acids which may be environmentally harmful, irritating, and corrosive. For example, PVC may generate objectionable amounts of hydrogen chloride (or hydrochloric acid when contacted with water) upon incineration, causing corrosion of the incinerator.

To be compatible with medical solutions, it is desirable that the components of the infusion delivery set be free from or have a minimal content of low molecular weight additives such as plasticizers, stabilizers and the like. In some applications, these components can be extracted into the therapeutic solutions that come into contact with the material. The additives may react with the therapeutic agents or otherwise render the solution ineffective. This is especially troublesome in bio-tech drug formulations where the concentration of the drug is measured in parts per million (ppm), rather than in weight or volume percentages. Even minuscule losses of the bio-tech drug can render the formulation unusable. Because bio-tech formulations can cost several thousand dollars per dose, it is imperative that the dosage not be changed.

Polyvinyl chloride ("PVC") has been widely used to fabricate medical tubings and containers as it meets most of these requirements. However, because PVC by itself is a rigid polymer, low molecular weight components known as plasticizers must be added to render PVC flexible. These plasticizers may leach out of the medical product and into the fluid passing through the products to contaminate the fluid or to render the fluid unusable. For this reason, and because of the difficulties encountered in incinerating PVC, there is a need to replace PVC in at least the fluid contacting portions of the infusion pathway and more preferably in its entirety.

Polyolefins have been developed which meet many of the requirements of medical containers and tubing, without the disadvantages associated with PVC. Polyolefins typically are compatible with medical applications because they have minimal extractability to the fluids and contents which they contact. Most polyolefins are environmentally sound as they do not generate harmful degradants upon incineration, and in most cases are capable of being thermoplastically recycled. Many polyolefins are cost effective materials that may provide an economic alternative to PVC. However, there are many hurdles to overcome to replace all the favorable attributes of PVC with a polyolefin.

For example, because of the inert nature of polyolefins, due in part to the non-polar nature of the polymer, difficulties have been encountered in bonding the polyolefin materials to rigid housings positioned along the infusion pathway of an infusion set. Typically, medical containers such as I.V. bags are connected to a patient through a series of connected tubing that have in fluid communication drip chambers, Y-type injection sites, venous catheters and the like between the bag and the patient. Many of these components include rigid housings manufactured from polycarbonates, acrylics, ABS, copolyesters and the like. The housings have sleeves in which the tubing is inserted in a telescoping fashion to attach the tube to the housing. Therefore, it is necessary for the medical tubing to be connected to the rigid housing to form a fluid tight seal with the housings.

PVC tubing is typically secured within such housings using solvent bonding techniques. Solvent bonding requires exposing the end of the tubing to be inserted into the housing to a solvent such as cyclohexanone or methyl ethyl ketone. The solvent effectively softens or dissolves the PVC so when the tubing is inserted into the housing, a bond is formed. Solvent bonding techniques, however, are ineffective on certain polyolefins including polyethylene and polypropylene. Problems have also been encountered in using adhesive bonding techniques.

European Patent Application No. 0 556 034 discloses a medical instrument of a material containing a resin of a cyclic olefin compound or a bridged polycyclic hydrocarbon compound. The EP '034 Application discloses making devices such as syringes, injection needles, drip chambers, blood bags and tubing from these resins. While the EP '034 Patent application discloses a non-PVC material for fabricating medical products it does not disclose a method for bonding a rigid housing of a cyclic olefin to a flexible tubing of a cyclic olefin or other polyolefins.

Cycloolefin blends are also well known for providing rigid, injection molded parts. For example, U.S. Pat. No. 5,359,001 discloses a multiple component polymer blend having a first component of a cycloolefin, a second component of a polyolefin and a third component of a cycloolefin block copolymer to compatibilize the cycloolefin and polyolefin. The '001 Patent discloses such blends for impact modifying the highly rigid and brittle cycloolefins. The '001 Patent does not disclose a method for solvent bonding these blends.

U.S. Pat. No. 5,863,986 discloses polymer alloy blends of a cycloolefin copolymers with one or more core-shell particles and one or more block copolymers. Again, these polymer blends are tough on impact and have high flexural strength and elongation at break. The '986 patent does not disclose a method for solvent bonding the polymer alloy blends.

DISCLOSURE OF INVENTION

The present invention provides a medical device of a polymer composition that is capable of being solvent bonded and has favorable clarity properties. The polymer composition comprises: a first component obtained by copolymerizing a norbornene monomer and an ethylene monomer, the first component being in an amount from about 1–99% by weight of the composition; and a second component of an ethylene and α-olefin copolymer, the α-olefin having 6 carbons, the second component being in an amount from about 99% to about 1% by weight of the composition. It has been found by the present inventors in blending norbornene ethylene copolymers with the ethylene an α-olefin copolymers that a more optically clear blend was obtained with an α-olefin having 6 carbons over α-olefins having 4 or 8 carbons. It is also desirable to utilize ethylene and α-olefins obtained using a metallocene or single-site catalyst.

To enhance the susceptibility of the composition to solvent bonding it is desirable that the norbornene comprise from at least about 20 mole percent of the norbonene copolymer, more preferably from at least about 30 mole percent norbornene and even more preferably from about 30–65 mole percent norbornene. The first component should also preferably comprise from at least about 30% by weight of the composition. The first component should also preferably have a glass transition temperature from about 70–180° C.

The present invention also provides for fabricating medical products from compositions having greater than 2 components such as 3-component blends and more.

BRIEF DESCRIPTION OF THE DRAWINGS

FIG. 1 shows a diagrammatic view of an infusion delivery set; and

FIG. 2 shows a diagrammatic view of a syringe barrel having end closures solvent bonded thereto.

BEST MODE FOR CARRYING OUT THE INVENTION

While the invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 shows an infusion delivery set 10 having an I.V. container 12 and port tube 14 connected to a tubing 16 which provides at its distal end a venous catheter 18 for establishing fluid-flow access to a vascular system of a patient. Positioned at intermediate portions of the infusion pathway is a drip chamber 20 and a Y-type injection site 22. It should be understood that other rigid medical housings include filter housings, tubing unions and others well known in the art, and that these components could be used in any combination in a delivery set 10. FIG. 2 shows a syringe barrel 24 having end closures 26 solvent bonded on opposite ends of the syringe barrel. Of course the end closure 26 can be on one or both ends of the syringe barrel 24.

As will be described below, the present invention provides polymers and copolymers containing monomers of cyclic olefins (which sometimes shall be referred to as cyclic olefin containing polymers) and blends thereof as well as homopolymers and copolymers containing monomers of bridged polycyclic hydrocarbons (which sometimes shall be referred to as bridged polycyclic hydrocarbon containing polymers) and blends thereof to fabricate both the flexible, rigid and semi-rigid components of the delivery set 10 and further provides solvent bonding and cement bonding techniques for attaching together olefin components to fabricate medical device assemblies and subassemblies contained in an infusion set or other medical devices well known in the medical arts.

The term polyolefin used herein is meant to include homopolymers and copolymers of ethylene, propylene, butene, pentene, hexene, heptene, octene, nonenene, and decene. Suitable copolymers of ethylene include: (a) ethylene copolymerized with monomers selected from the group of α-olefins having 3–10 carbons, lower alkyl and lower alkene substituted carboxylic acids and ester and anhydride derivatives thereof, (b) ethylene propylene rubbers, (c) EPDM, and (d) ionomers. Preferably, the carboxylic acids have from 3–10 carbons. Such carboxylic acids therefore include acetic acid, acrylic acid and butyric acid. The term "lower alkene" and "lower alkyl" is meant to include a carbon chain having from 3–18 carbons more preferably 3–10 and most preferably 3–8 carbons. Thus, a subset of this group of comonomers includes, as a representative but non-limiting example, vinyl acetates, vinyl acrylates, methyl acrylates, methyl methacrylates, acrylic acids, methacrylic acids, ethyl acrylates, and ethyl acrylic acids.

I. Cyclic Olefins and Bridged Polycyclic Hydrocarbons

Suitable homopolymer and copolymers of cyclic olefins and bridged polycyclic hydrocarbons and blends thereof can be found in U.S. Pat. Nos. 5,218,049, 5,854,349, 5,863,986, 5,795,945, 5,792,824; EP 0 291,208, EP 0 283,164, EP 0 497,567 which are incorporated in their entirety herein by reference and made a part hereof. In a preferred form of the invention these homopolymers, copolymers and polymer blends will have a glass transition temperature of greater than 50° C., more preferably from about 70° C. to about 180° C., a density greater than 0.910 g/cc and more preferably from 0.910 g/cc to about 1.3 g/cc and most preferably from 0.980 g/cc to about 1.3 g/cc and have from at least about 20 mole % of a cyclic aliphatic or a bridged polycyclic in the backbone of the polymer more preferably from about 30–65 mole % and most preferably from about 30–60 mole %.

In a preferred form of the invention, suitable cyclic olefin monomers are monocyclic compounds having from 5 to about 10 carbons in the ring. The cyclic olefins can selected from the group consisting of substituted and unsubstituted cyclopentene, cyclopentadiene, cyclohexene, cyclohexadiene, cycloheptene, cycloheptadiene, cyclooctene, cyclooctadiene. Suitable substituents include lower alkyl, acrylate derivatives and the like.

In a preferred form of the invention, suitable bridged polycyclic hydrocarbon monomers have two or more rings and more preferably contain at least 7 carbons. The rings can be substituted or unsubstituted. Suitable substitutes include lower alkyl, aryl, aralkyl, vinyl, allyloxy, (meth) acryloxy and the like. The bridged polycyclic hydrocarbons are selected from the group consisting of those disclosed in the above incorporated patents and patent applications. Suitable bridged polycyclic hydrocarbon containing polymers are sold by Ticona under the tradename TOPAS, by Nippon Zeon under the tradename ZEONEX and ZEONOR, by Daikyo Gomu Seiko under the tradeanme CZ resin, and by Mitsui Petrochemical Company under the tradename APEL.

Suitable comonomers include α-olefins having from 3–10 carbons, aromatic hydrocarbons, other cyclic olefins and bridged polycyclic hydrocarbons.

It may also be desirable to have pendant groups associated with the above-mentioned homopolymers and copolymers. The pendant groups are for compatibilizing the cyclic olefin containing polymers and the bridged polycyclic hydrocarbon containing polymers with more polar polymers including amine, amide, imide, ester, carboxylic acid and other polar functional groups. Suitable pendant groups include aromatic hydrocarbons, carbon dioxide, monoethylenically unsaturated hydrocarbons, acrylonitriles, vinyl ethers, vinyl esters, vinylamides, vinyl ketones, vinyl halides, epoxides, cyclic esters and cyclic ethers. The monethylencially unsaturated hydrocarbons include alkyl acrylates, and aryl acrylates. The cyclic ester includes maleic anhydride.

II. Blends Containing Cyclic Olefin Containing Polymers and/or Bridged Polycyclic Hydrocarbon Containing Polymers Suitable two-component blends of the present invention include as a first component the homopolymers and copolymers of the cyclic olefin containing polymers and the bridged polycyclic hydrocarbon containing polymers (collectively hereinafter sometimes referred to as "COCs") described above in Section I. The COCs should be present in an amount from about 1–99% by weight of the blend, more preferably from about 30–99%, and most preferably from about 35–99 weight percent or any combination or subcombination or ranges therein. In a preferred form of the invention the first components has a glass transition temperature of from about 70° C. to about 130° C. and more preferably from about 70–110° C.

The blends further include a second component in an amount by weight of the blend of from about 99–1%, more preferably from about 70–1% and most preferably from about 65–1%. The second component is selected from the group consisting of homopolymers and copolymers of ethylene, propylene, butene, hexene, octene, nonene, decene and styrene. The second component preferably has a density of from about 0.870–0.960 g/cc and more preferably from about 0.910–0.960 g/cc and more preferably from about 0.930–0.960 g/cc. In a preferred form of the invention the second component is and ethylene and α-olefin copolymer where the α-olefin has from 3–10 carbons, more preferably from 4–8 carbons and most preferably 6 carbons. Most preferably the ethylene and α-olefin copolymers are obtained using a metallocene catalyst.

Suitable three-component blends include as a third component a COC selected from those COCs described in Part I above and different from the first component. In a preferred form of the invention the second COC will have a glass transition temperature of higher than about 120° C. when the first COC has a glass transition lower than about 120° C. In a preferred form of the invention, the third component is present in an amount by weight of from about 10–90% by weight of the blend and the first and second components should be present in a ratio of from about 2:1 to about 1:2 respectively of the first component to the second component.

In a preferred form of the invention, random and block copolymers of norbornene and ethylene are selected as the first component of the blend. These norbornene copolymers are described in detail in U.S. Pat. Nos. 5,783,273, 5,744,664, 5,854,349, and 5,863,986. The norborene ethylene copolymer preferably has from at least about 20 mole percent norbornene monomer and more preferably from about 20–75 mole percent and most preferably from about 30–60 mole percent norbornene monomer or any combination or subcombination of ranges therein. The norbornene ethylene copolymer should have a glass transition temperature of from about 70–180° C., more preferably from 70–130° C. and even more preferably from about 70–100° C.

The second component is preferably an ethylene copolymerized with an α-olefin having 6 carbons. It has been found by the present inventors that using this ethylene and a 6 carbon α-olefin as the second component yields blends with higher clarity when compared to blends having ethylene copolymerized with α-olefins having 4 or 8 carbons. Preferably, the ethylene and α-olefin copolymers are obtained using metallocene catalysts. Suitable catalyst systems, among others, are those disclosed in U.S. Pat. Nos. 5,783,638 and 5,272,236. Suitable ethylene and α-olefin copolymers include those sold by Dow Chemical Company under the AFFINITY and ENGAGE tradenames, those sold by Exxon under the EXACT tradename and those sold by Phillips Chemical Company under the tradename MARLEX.

As set forth above, the first component of the norbornene/ethylene copolymer can be present from about 1–99% by weight of the blend, more preferably from about 30–99% by weight, and most preferably 35–99% by weight.

In a preferred three-component blend a second norbornene and ethylene copolymer is added to the two component norbornene-ethylene/ethylene 6 carbon α-olefin blend. The second norbornene ethylene copolymer should have a norbornene monomer content of 30 mole percent or greater and more preferably from about 35–75 mole percent and a glass transition temperature of higher than 120° C. when the first component has a glass transition temperature of lower than 120° C.

III. Medical Products

Medical devices such as those shown in FIG. 1 may be fabricated from the COCs set forth above. The present invention provides for fabricating, rigid, semi-rigid and flexible devices from the COCs. What is meant by the use of the term "rigid" herein is parts having a modulus of elasticity of at least 150,000 psi when measured in accordance with ASTM D790. What is meant by the term "semi-rigid" is parts having a modulus of elasticity of greater than 20,000 psi but less than 150,000 psi when measured in accordance with ASTM D790. What is meant by the term "flexible" is articles having a modulus of elasticity of less than about 20,000 psi when measured in accordance with ASTM D790.

Rigid parts such as Y-sites, filter housings, injection sites, spikes, syringe barrels, closures and others may be fabricated from the COCs by injection molding, blow molding, thermoforming processes or other plastic fabricating techniques. Semi-rigid parts such as drip chambers and closures may be fabricated from injection molding, blow molding, thermoforming and extrusion processes. Flexible parts such as medical tubing, closures and medical containers may be obtained using extrusion, coextrusion, lamination, blow molding and injection molding processes.

For flexible and semi-rigid components such as tubing, containers and drip chamber 20, suitable polymers also include other polyolefins such as ethylene vinyl acetate copolymers having a vinyl acetate content of from about 5% to about 32%, ethylene methacrylate copolymers, ethylene and α-olefin copolymers having a density of less than 0.910 g/cc, flexible polypropylenes such as Huntsman's REFLEX and Montell's ADFLEX and stereo block homopolymers of polypropylene disclosed in U.S. Pat. No. 5,594,080. Suitable polymers also include polymer blends and films such as those disclosed in U.S. Pat. No. 5,849,843 and U.S. patent application Ser. No. 08/153,602.

IV. Method of Solvent Bonding COCs

The present invention provides a method for assembling components of an infusion set into medical assemblies using solvent bonding techniques. Solvent bonding techniques can be used to join together any combination of rigid, semi-rigid and flexible parts including joining two rigid components, a rigid component to a semi-rigid component, a rigid component to a flexible component, a semi-rigid component to a flexible component, a semi-rigid component to another semi-rigid component, and certain flexible components to one another.

The method of solvent bonding includes the steps of: (1) providing a first article of a polymer composition described above in Sections I and II such as those having a first component of cyclic olefin containing polymer or a bridged polycyclic hydrocarbon containing polymer, the first component being present in an amount from about 30% to about 100% by weight of the composition; (2) providing a second article of a material selected from the group comprising low crystallinity polymers; (3) applying a solvent to one of the first article or the second article to define an interface area; and (4) bonding the first article to the second article along the interface area.

Suitable low crystallinity polymers to fabricate the second article include COCs, COC blends having minimally 30% COC by weight, polymethyl pentene, polyolefins having a modulus of elasticity of less than 10,000 psi when measured in accordance with ASTM D790, and styrene containing polymers without modulus limitations.

Suitable solvents are those having a solubility parameter of less than about 20 $(MPa)^{1/2}$, more preferably less than about 19 $(MPa)^{1/2}$ and most preferably less than about 18 $(MPa)^{1/2}$ and include, but are not limited to, aliphatic hydrocarbons, aromatic hydrocarbons, mixtures of aliphatic hydrocarbons, mixtures of aromatic hydrocarbons and mixtures of aromatic and aliphatic hydrocarbons. Suitable aliphatic hydrocarbons include substituted and unsubstituted hexane, heptane, cyclohexane, cycloheptane, decalin, and the like. Suitable aromatic hydrocarbons include substituted and unsubstituted aromatic hydrocarbon solvents such as xylene, tetralin, toluene, and cumene. Suitable hydrocarbon substituents include aliphatic substituents having from 1–12 carbons and include propyl, ethyl, butyl, hexyl, tertiary butyl, isobutyl and combinations of the same. What is meant by the terms aliphatic hydrocarbon" and "aromatic hydrocarbon" is a compound containing only carbon and hydrogen atoms. Suitable solvents will also have a molecular weight less than about 200 g/mole, more preferably less than about 180 g/mole and most preferably less than about 140 g/mole.

The first article can be rigid, semi-rigid and flexible medical product selected from the group consisting of Y-sites, filter housings, drip chambers, heparin locks, injection sites, catheters, spikes, syringe barrels, closures, tubings, oxygenators, pump casettes, valves, burretes, and any medical article or component. The second article can be rigid, semi-rigid and flexible polymeric material selected from the group comprising polyolefins, styrene containing polymers, cyclic olefin containing polymers and bridged polycyclic hydrocarbon containing polymers. The second article can be of the same device set forth for the first article.

In a preferred form of the invention, the method comprises the steps of: (1) providing a first article of a polymer composition comprising: (a) a first component obtained by polymerizing a norbornene monomer and an ethylene monomer, the norbornene monomer being present in an amount of at least about 20 mole percent of the copolymer, the first component being present in an amount from about 30% to about 100% by weight of the composition; and (b) a second component of a first ethylene and α-olefin copolymer, the second component being in an amount from about 70% to about 0% by weight of the composition; (2) providing a second article of a low crystallinity polymer; (3) applying a solvent to one of the first article or the second article to define an interface area; and (4) bonding the first article to the second article along the interface area.

V. COC Cement

For those flexible polymers that do not bond well to other flexible polymers using the solvent bonding techniques described above in Section IV, the present invention provides a cyclic olefin containing polymer based cement composition or bridged polycyclic hydrocarbon containing polymer based cement composition. The first component of the cement composition is selected from those set forth in Section I above and include a homopolymer or copolymer of a cyclic olefin or a bridged polycyclic hydrocarbon in an amount from 1–20% by weight of the composition, more preferably from 1–15% and most preferably from 3–10%, and a second component of a solvent having a solubility parameter of less than about 20 $(Mpa)^{1/2}$ more preferably less than about 19 $(Mpa)^{1/2}$ and most preferably less than about 18 $(MPa)^{1/2}$ and more preferably selected from the group of aliphatic hydrocarbons and aromatic hydrocarbons set forth above in Section IV. Suitable solvents will also have a molecular weight less than about 200 g/mole, more preferably less than about 180 g/mole and most preferably less than about 140 g/mole.

These cement compositions can also be used for bonding flexible articles to rigid articles, flexible articles to semi-rigid articles, semi-rigid articles to one another or for bonding semi-rigid articles to rigid articles or for bonding rigid articles to one another. Accordingly, the cement compositions can be used to prepare medical device assemblies such as joining flexible tubings to one another, joining flexible tubings to tubing unions and flexible tubings to drip chambers, flexible tubings to Y-sites and other rigid housings or any of the components of the medical infusion set or other medical device assemblies.

It may also be desirable to include in the cement composition polymer resins from the articles being joined. These optional components can be added in an amount by weight of the composition from 0–10%, more preferably from 0.2–5% and most preferably from 0.2–3%. The third component can be selected from the group comprising polyethylene copolymers having a density less than 0.880 g/cc, polymethyl pentene, polypropylene having a modulus of less than 10,000 psi and more preferably less than 4,000 psi, and certain styrene containing copolymers and interpolymers. Typically these flexible type polypropylenes are atactic. Certain polypropylene copolymers with ethylene are also suitable. Suitable styrene containing polymers include Dow's interpolymer of styrene sold under the tradename INDEX. Other suitable styrene containing polymers include SBS, SIS and hydrogenated derivatives thereof such as SEBS and SEPS.

The method of using a polymeric cement to assemble medical devices comprises the steps of: (1) providing a first article of a low crystallinity polymers set forth above; (2) providing a second article of a low crystallinity polymer set forth above; (3) providing a cement composition having a first component of a cyclic olefin containing polymer or a bridged polycyclic hydrocarbon containing polymer and a second component of an effective amount of a solvent having a solubility parameter of less than about 20 $(MPa)^{1/2}$ and more preferably selected from the group of aliphatic hydrocarbons and aromatic hydrocarbons having a molecular weight less than about 200 g/mole; (4) applying the cement composition to one of the first and second articles to define a bonding area; and (5) attaching the first article to the second article along the bonding area to fixedly attach the first article to the second article.

Suitable polyolefins for the first and second articles can be selected from the group comprising homopolymers and copolymers of ethylene, propylene, butene, pentene, hexene, heptene, octene, nonenene, and decene. Suitable copolymers of ethylene include: (a) ethylene copolymerized with monomers selected from the group of α-olefins having 3–10 carbons, lower alkyl and lower alkene substituted carboxylic acids and ester and anhydride derivatives thereof, (b) ethylene-propylene rubbers, (c) EPDM, and (d) ionomers. Preferably, the carboxylic acids have from 3–10 carbons. Such carboxylic acids therefore include acetic acid, acrylic acid and butyric acid. The term "lower alkene" and "lower alkyl" is meant to include a carbon chain having from 3–18 carbons more preferably 3–10 and most preferably 3–8 carbons. Thus, a subset of this group of comonomers includes, as a representative but non-limiting example, vinyl acetates, vinyl acrylates, methacrylates, methyl methacrylates, acrylic acids, methyl acrylic acids, ethyl acrylates, and ethyl acrylic acids.

The first component of the cement composition can also be a copolymer of the cyclic olefins or the bridged polycyclic hydrocarbons set forth above in Section I. Suitable comonomers of the COCs can be selected from the group comprising α-olefins having from 2–10 carbons, aromatic hydrocarbons, cyclic olefins, and bridged polycyclic hydrocarbons. In a preferred form of the invention the first component is a copolymer of a norbornene monomer and an ethylene monomer and more preferably the norbornene monomer is present in at least about 20 mole percent of the copolymer and even more preferably the norbornene is present from about 30 to about 60 mole percent.

The cement composition can also have an additional optional component selected from the group of polyethylene copolymers having a density less than about 0.880 g/cc, polymethyl pentene, polypropylene having a modulus of less than about 10,000 psi and more preferably less than about 4,000 psi, and certain styrene containing copolymers and interpolymers. Typically these flexible type polypropylenes are atactic. Certain polypropylene copolymers with ethylene are also suitable. Suitable styrene and ethylene containing polymers include Dow's interpolymer of styrene sold under the tradename INDEX. Other suitable styrene containing polymers include SBS, SIS and hydrogenated derivatives thereof such as SEBS and SEPS.

In a preferred form of the invention, the method for using a polymeric cement to assemble medical devices comprises the steps of: (1) providing a first article of a low crystallinity polymer set forth above; (2) providing a second article of a low crystallinity polymer set forth above; (3) providing a cement composition comprising: (a) a first component in an amount by weight of from 1–20% of the cement composition and obtained by copolymerizing a norbornene monomer and an ethylene monomer, the norbornene monomer being present in an amount of at least about 20 mole percent of the copolymer; (b) a second component of a solvent in an amount by weight from about 99% to about 80% of the cement composition; and (c) an optional third component in an amount by weight from about 0–10% by weight of the cement composition and selected from the group of optional components set forth above; (4) applying the cement composition to one of the first and second articles to define a bonding area; and (5) attaching the first article to the second article along the bonding area to fixedly attach the first article to the second article.

The present invention also provides a medical device assembly. The assembly has a first article of a first polymeric material selected from the group comprising polyolefins, styrene containing polymers, cyclic olefin containing polymers and bridged polycyclic hydrocarbon containing polymers. The assembly also has a second article of a polymeric material selected from the group comprising polyolefins, styrene containing polymers, cyclic olefin containing polymers and bridged polycyclic hydrocarbon containing polymers. The first article is attached to the second article with a cement composition. The cement composition has a first component of a cyclic olefin containing polymer or a bridged polycyclic hydrocarbon containing polymer and an effective amount of a solvent having a solubility parameter of less than about 20 $(MPa)^{1/2}$ and more preferably selected from the group of aliphatic hydrocarbons and aromatic hydrocarbons having a molecular weight less than about 200 g/mole. The following are non-limiting examples of the present invention.

EXAMPLES

Example I. Test methods for resin properties:
Tensile Modulus: ASTM D638.
Flexural Modulus: ASTM D790.
Glass Transition Temperature: DSC.
Light Transmittance: ASTM D1003.
Example II. Resin Properties:
(1) COC Resins:
Topas resins are produced by Ticona, a member of the Hoechst Group. CZ Resin is marketed by Daikyo Gomu Seiko and The West Company. Zeonex resin is produced by Nippon Zeon Co., Ltd.

| Resin | Glass Transition Tg, (° C.) | Tensile Modulus (kpsi) | Light Transmittance (%) |
|---|---|---|---|
| Topas 8007 | 85 | 377 | 92 |
| Topas 6013 | 130 | 464 | 92 |
| Topas 6015 | 160 | 464 | 92 |
| Topas 6017 | 180 | 464 | 92 |
| CZ Resin | 140 | 341 | 91 |
| Zeonex 230 | 140 | 341 | 91 |

(2) Non-COC Resins:

| Material | Tensile/Flexural Modulus (kpsi) | Density (g/cc) | Comonomer |
|---|---|---|---|
| Polyethylene: | | | |
| Dow Chemicals Affinity VP8770 | 5 | 0.885 | Octene |
| Dow Chemicals Affinity PL1880 | 12 | 0.903 | Octene |
| Du Pont Dow Engage 8003 | 5 | 0.885 | Octene |
| Du Pont Dow Engage 8411 | 3 | 0.880 | Octene |
| Dow Chemicals Dowlex 2045 | 38 | 0.920 | Octene |
| Mitsui Tafmer A4085 | 5 | 0.885 | Butene |
| Exxon Exact 3024 | 14 | 0.905 | Butene |
| Exxon Exact 3128 | 12 | 0.900 | Butene |
| Exxon Exact 4033 | 3 | 0.880 | Butene |
| Exxon Exact 3030 | 14 | 0.905 | Hexene |
| Exxon Exact 3131 | 11 | 0.900 | Hexene |
| Phillips Marlex mPACT D143 | 23 | 0.916 | Hexene |
| Phillips Marlex mPACT D350 | 64 | 0.933 | Hexene |
| Polypropylene: | | | |
| Huntsman Rexflex W304 | 2 | 0.88 | |
| Huntsman Rexflex W210 | 4 | 0.89 | |
| EVA | | | |
| Du Pont Elvax CM576 | 2.5 | 0.95 | |
| Polybutene | | | |
| Montell PB0200 | 35 | 0.915 | |
| Montell PB8340 | 32 | 0.908 | |
| Styrenic copolymer | | | |
| Phillips K-Resin KR03 | 210 | 1.01 | |
| Shell Kraton G 1657 | 0.4 | 0.90 | |

(3) Solvents used in the examples:
All solvents were purchased from the Sigma-Aldrich Co. The solubility parameters reported below are the Hansen Solubility Parameters at 25 degree C, as listed in the Polymer Handbook, $3^{rd}$ Ed., Chapter VII, Pages 540–544 unless otherwise specified.

| Solvent | Solubility Parameter $(MPa)^{1/2}$ | Molecular Weight (g/mol) | Type of compound |
|---|---|---|---|
| Cyclohexane | 16.8 | 84 | Aliphatic hydrocarbon |
| Methyl cyclohexane | 16.0 | 98 | Aliphatic hydrocarbon |
| Ethyl cyclohexane | 16.3* | 112 | Aliphatic hydrocarbon |
| Propyl cyclohexane | 16.2* | 126 | Aliphatic hydrocarbon |
| n-Butyl cyclohexane | 16.2* | 140 | Aliphatic hydrocarbon |
| t-Butyl cyclohexane | — | 140 | Aliphatic hydrocarbon |
| Decalin | 18.0–18.8 | 138 | Aliphatic hydrocarbon |
| Heptane | 15.3 | 100 | Aliphatic hydrocarbon |
| Xylene | 18.0 | 106 | Aromatic hydrocarbon |

-continued

| Solvent | Solubility Parameter $(MPa)^{1/2}$ | Molecular Weight (g/mol) | Type of compound |
|---|---|---|---|
| Tetralin | 20.0 | 132 | Aromatic hydrocarbon |
| Cumene | 17.6* | 120 | Aromatic hydrocarbon |
| Toluene | 18.2 | 92 | Aromatic hydrocarbon |
| Cyclohexanone | 19.6 | 98 | Ketone |
| Methyl ethyl ketone | 19.0 | 72 | Ketone |
| Methylene chloride | 20.3 | 85 | Halohydrocarbon |
| Tetrahydrofuran | 19.4 | 72 | Ether |
| Dimethyl formamide | 24.8 | 73 | Nitrogen containing compound |
| Dimethyl sulfoxide | 26.6 | 78 | Sulfur containing Compound |

*Data from CRC Handbook of Solubility Parameters and Other Cohesion Parameters, 2nd Ed.

Example III. Test articles and solvent bonding test results: All the COC blends set forth in the table below were prepared using a Brabender mixer, mixed at 250° C. at 50 rpm for about 4 minutes, and then compression molded into 0.010" to 0.025" thick sheets at 450° F.

| COC Blend Composition | Blend Ratio (wt %) | Material Rigidity | Strength of Solvent Bonding[1] to ULDPE[2] (flexible) | to EVA[3] (flexible) | to COC[3] (rigid) |
|---|---|---|---|---|---|
| Topas 8007/ Tafmer A4085 | 0/100 | flexible | none | none | good |
| | 30/70 | semi-rigid | weak | weak | good |
| | 50/50 | rigid | good | good | strong |
| | 70/30 | rigid | strong | strong | strong |
| Topas 8007/ Affinity VP8770 | 0/100 | flexible | none | none | good |
| | 50/50 | rigid | good | good | strong |
| Topas 8007/ Affinity PL1880 | 0/100 | flexible | none | none | weak |
| | 50/50 | rigid | good | good | strong |
| Topas 8007/ Engage 8411 | 0/100 | flexible | none | none | good |
| | 50/50 | rigid | good | good | strong |
| Topas 8007/ Exact 3024 | 0/100 | flexible | none | none | weak |
| | 50/50 | rigid | good | good | strong |
| | 70/30 | rigid | strong | strong | strong |
| Topas 8007/ Exact 3128 | 0/100 | flexible | none | none | weak |
| | 50/50 | rigid | good | good | strong |
| Topas 8007/ Exact 4033 | 0/100 | flexible | none | none | good |
| | 50/50 | rigid | good | good | strong |
| Topas 8007/ Engage 8003 | 30/70 | semi-rigid | weak | | |
| | 40/60 | rigid | good | | |
| | 50/50 | rigid | good | | |
| | 60/40 | rigid | strong | | |
| | 70/30 | rigid | strong | | |
| | 80/20 | rigid | strong | | |
| | 90/10 | rigid | strong | | |
| Topas 6017/ Dowlex 2045 | 0/100 | semi-rigid | none | none | none |
| | 50/50 | rigid | good | good | strong |
| Topas 6015/ Tafmer A4085 | 30/70 | rigid | weak | weak | good |
| | 50/50 | rigid | good | good | strong |
| | 70/30 | rigid | good | good | strong |
| Topas 8007/ Rexflex W304 | 0/100 | flexible | none | none | good |
| | 30/70 | semi-rigid | weak | weak | good |
| | 50/50 | rigid | good | good | strong |
| | 70/30 | rigid | strong | strong | strong |
| Topas 8007/ PB0200 | 0/100 | semi-rigid | none | none | none |
| | 50/50 | rigid | good | good | strong |
| Topas 8007/ PB8340 | 0/100 | semi-rigid | none | none | none |
| | 50/50 | rigid | good | good | strong |
| Topas 6015/ PB0200 | 50/50 | rigid | good | good | strong |
| Topas 6015/ PB8340 | 50/50 | rigid | good | good | strong |
| Topas 8007/ Kraton G1657 | 0/100 | flexible | none | none | good |
| | 30/70 | semi-rigid | weak | weak | good |
| | 50/50 | rigid | good | good | strong |
| | 70/30 | rigid | good | good | strong |
| Topas 8007/ K-Resin KR01 | 0/100 | rigid | none | none | weak |
| | 50/50 | rigid | good | good | strong |
| Topas 6015/ K-Resin KR01 | 50/50 | rigid | good | good | strong |
| Topas 6015/ Tafmer A4085/ Kraton G1657 | 60/20/20 | rigid | good | good | strong |
| Topas 6017/ Topas 8007 | 25/25/50 | rigid | good | good | strong |
| Affinity VP8770 | 30/20/50 | rigid | good | good | strong |
| Topas 6015/ Topas 8007/ Affinity VP8770 | 25/25/50 | rigid | good | good | strong |

[1]The solvent used is cyclohexane. Bond strength was assessed by hand pull test, at one day after the solvent bonding.
Ratings:
None = Readily separable.
Weak = Some bond strength but easy to separate.
Good = Hard to separate, no material transfer is visible on the peeled surface but is suitable for providing a sterile, sturdy connection.
Strong = Very hard to separate, material transferring from one surface to another at the peeling bonding interface is visible.
[2]The ULDPE specimen was made from Dow Chemicals Engage 8003 resin and was extruded into a tube.
[3]) The EVA specimen was made from DuPont Elvax CM576 resin which had 28% VA content, and was extruded into a tube.
[4]) The COC specimen was made from Topas 8007 resin and was injection molded into y-site with the bonding site in a tube geometry.

IV. Examples of using different solvents to bond COC containing devices:

| Combination | Material-1 to Material-2 | Solvent | Bond Strength |
|---|---|---|---|
| Rigid to Flexible | Topas 8007[a] to Engage 8003[b] | Cyclohexane | good |
| | | Ethyl cyclo hexane | good |
| | | Propyl cyclo hexane | good |
| | | n-Butyl cyclo hexane | good |
| | | t-Butyl cyclo hexane | good |
| | | Xylene | good |
| | | Tetralin | good |
| | | Decalin | good |
| | | Heptane | good |
| | | Cumene | good |
| | | Toluene | weak |
| | | Cyclohexanone | none |
| | | Methyl ethyl ketone | none |
| | | Methylene chloride | none |
| | | Tetrahydrofuran | none |
| | | Dimethyl formamide | none |
| | | Dimethyl sulfoxide | none |
| Rigid to Flexible | Topas 8007[a] to Elvax CM576[b] | Cyclohexane | good |
| | | Ethyl cyclo hexane | good |
| | | Propyl cyclo hexane | good |
| | | n-Butyl cyclo hexane | good |
| | | t-Butyl cyclo hexane | good |
| | | Xylene | good |
| | | Tetralin | good |
| | | Decalin | good |

-continued

| Combination | Material-1 to Material-2 | Solvent | Bond Strength |
|---|---|---|---|
| | | Heptane | good |
| | | Cumene | good |
| | | Toluene | weak |
| | | Cyclohexanone | none |
| | | Methyl ethyl ketone | none |
| | | Methylene chloride | none |
| | | Tetrahydrofuran | none |
| | | Dimethyl formamide | none |
| | | Dimethyl sulfoxide | none |
| Rigid to Rigid | Topas 8007[c] to Topas 8007[c] | Cyclohexane | strong |
| | | n-Butyl cyclo hexane | strong |
| | | Xylene | strong |
| | | Tetralin | strong |
| | | Heptane | strong |

Note:
[a]Injection molded into y-site.
[b]Extruded tubing.
[c]Compression molded sheet.
Bond strength was assessed by hand pull test, at one day after the solvent bonding.
Ratings:
None = Readily separable.
Weak = Some bond strength but easy to separate.
Good = Hard to separate, no material transfer is visible on the peeled surface but is suitable for providing a sterile, sturdy connection.
Strong = Very hard to separate, material transferring from one surface to another at the peeled bonding interface is visible.

V. Examples of cements made by dissolving the COC resin in solvents for bonding flexible polyolefin components:

The COC cements were prepared by dissolving the COC into a solvent at room temperature. Elevated temperature such as 50° C. can be used to enhance the speed of the preparation of the cement solution.

| Cement formulation | Composition | | |
|---|---|---|---|
| A | coc resin: | Topas 8007 | 1% wt |
| | solvent: | Cyclohexane | 99% wt |
| B | coc resin: | Topas 8007 | 5% wt |
| | solvent: | Cyclohexane | 95% wt |
| C | coc resin: | Topas 8007 | 15% wt |
| | solvent: | Cyclohexane | 85% wt |
| D | coc resin: | Topas 8007 | 5% wt |
| | solvent: | n-Butyl cyclohexane | 95% wt |
| E | coc resin: | Topas 8007 | 5% wt |
| | solvent: | Decalin | 95% wt |
| F | coc resin: | Topas 8007 | 5% wt |
| | solvent: | Heptane | 95% wt |
| G | coc resin: | Topas 5013 | 5% wt |
| | solvent: | Cyclohexane | 95% wt |
| H | coc resin: | Topas 5013 | 20% wt |
| | solvent: | Cyclohexane | 80% wt |

VI. Examples of bonding a flexible component to a flexible component using COC cement compositions of Example IV. Tubings made of ULDPE (Engage 8003) or EVA (Elvax CM 576) were extruded and cut into segments. Cement was applied between bonding interfaces of the tubing segments identified in the following table. The bonding was done by applying small amount of the cement at the bonding interface. Bond strength was measured by a hand pull test conducted one day after bonding.

| Flexible to flexible bonding | Cement | Bond Strength |
|---|---|---|
| Engage 8003 to Engage 8003 | A | weak |
| Engage 8003 to Engage 8003 | B | good |
| Engage 8003 to Engage 8003 | C | good |
| Engage 8003 to Engage 8003 | D | good |
| Engage 8003 to Engage 8003 | E | good |
| Engage 8003 to Engage 8003 | F | good |
| Elvax CM 576 to Elvax CM 576 | A | weak |
| Elvax CM 576 to Elvax CM 576 | B | good |
| Elvax CM 576 to Elvax CM 576 | C | good |
| Elvax CM 576 to Elvax CM 576 | D | good |
| Elvax CM 576 to Elvax CM 576 | E | good |
| Elvax CM 576 to Elvax CM 576 | F | good |
| Elvax CM 576 to Elvax CM 576 | G | good |
| Elvax CM 576 to Elvax CM 576 | H | good |

Bond strength was assessed by hand pull test, at one day after the bonding.
Ratings:
None = Readily separable.
Weak = Some bond strength but easy to separate.
Good = Hard to separate, no material transfer is visible on the peeled surface but is suitable for providing a sterile, sturdy connection.
Strong = Very hard to separate, material transferring from one surface to another at the peeled bonding interface is visible.

VI. COC Blends Blends of the components set forth in the following table were prepared with a Brabender mixer at 250° C. at 50 rpm for 4 minutes. Films were prepared by compression molding at 450° F. to a thickness about 0.4 mm. The Haze property is useful for the end user to see through the medical device for the purpose of examining the liquid level, particulates, contamination, or the presence of drugs. Lower haze gives clearer view and higher haze gives a fuzzy view. Low haze is frequently a desirable property for medical devices such as solution containers, drug delivery devices, I.V. and blood sets, dialysis devices, and syringes. The haze and total light transmittance of the film were measured using a ColorQuest instrument with both sides of the film wetted with isopropyl alcohol to remove the effect of surface roughness. Example VI A: Blends of COC with styrenic copolymers and polypropylene.

| COC Blend Composition | Blend Ratio (wt %) | Light Transmittance (%) | Haze (%) |
|---|---|---|---|
| Topas 8007/Rexflex W304 | 30/70 | 70 | 85 |
| | 50/50 | 75 | 83 |
| | 70/30 | 75 | 81 |
| Topas 8007/Kraton G1657 | 30/70 | 64 | 86 |
| | 50/50 | 82 | 80 |
| | 70/30 | 84 | 80 |
| Topas 8007/K-Resin KR01 | 50/50 | 72 | 83 |
| Topas 6015/K-Resin KR01 | 50/50 | 58 | 86 |

Examples VI B-D: Blends of COC with polyethylene:
Summary:

The polymer blends that have lower haze, i.e. better clariy, are Topas 8007 blended with ethylene copolymers that have hexene comonomer polymerized with metallocene catalyst. The blends with the lowest haze are from the blends with polyethylene with hexene comonomer, polymerized with a metallocene catalyst and with a density of higher than 0.900 and more preferably higher than 0.93 (e.g. Marlex D350).

Example VI B: Blends of Topas 8007 (Tg~80 deg C) and polyethylene with different comonomers.

| COC Blend Composition | Blend Ratio | Comonomer in Polyethylene | Light Transmittance (%) | Haze (%) |
|---|---|---|---|---|
| Topas 8007/Tafmer A4085 | 30/70 | Butene | 84 | 80 |
| | 50/50 | | 89 | 70 |
| | 70/30 | | 81 | 61 |
| Topas 8007/Exact 3024 | 50/50 | Butene | 88 | 83 |
| Topas 8007/Exact 3128 | 50/50 | Butene | 88 | 77 |
| Topas 8007/Exact 4033 | 50/50 | Butene | 81 | 81 |
| Topas 8007/Exact 3131 | 50/50 | Hexene | 93 | 60 |
| Topas 8007/Exact 3030 | 50/50 | Hexene | 84 | 64 |
| Topas 8007/Marlex D143 | 30/70 | Hexene | 87 | 53 |
| | 50/50 | | 91 | 58 |
| | 70/30 | | 90 | 52 |
| Topas 8007/Marlex D350 | 20/80 | Hexene | 89 | 54 |
| | 30/70 | | 87 | 44 |
| | 50/50 | | 91 | 46 |
| | 70/30 | | 91 | 45 |
| | 90/10 | | 92 | 25 |
| Topas 8007/Affinity VP8770 | 50/50 | Octene | 85 | 72 |
| Topas 8007/Affinity PL1880 | 50/50 | Octene | 90 | 77 |
| Topas 8007/Engage 8411 | 50/50 | Octene | 91 | 84 |

Example VI C: Blends of Topas 6015 (Tg~160 deg C) and polyethylene with different comonomers.

| COC Blend Composition | Blend Ratio | Comonomer in Polyethylene | Light Transmittance (%) | Haze (%) |
|---|---|---|---|---|
| Topas 6015/Tafmer TFB-01 | 30/70 | Butene | 65 | 84 |
| | 50/50 | | 78 | 85 |
| | 70/30 | | 47 | 85 |
| Topas 6015/Marlex D143 | 30/70 | Hexene | 76 | 85 |
| | 50/50 | | 83 | 83 |
| | 70/30 | | 77 | 79 |
| Topas 6015/Marlex D350 | 30/70 | Hexene | 54 | 81 |
| | 50/50 | | 80 | 72 |
| | 70/30 | | 79 | 76 |
| Topas 6015/Exact 3030 | 30/70 | Hexene | 86 | 84 |
| | 50/50 | | 82 | 84 |
| | 70/30 | | 62 | 83 |

Example VI D: Blends of Topas 6017 (Tg~180 deg C), Topas 8007 (Tg~80 deg C) and polyethylene with different comonomers.

Conclusion:

The blend that has reduced haze contains Topas 8007 and a metallocene catalyst polymerized ethylene hexene copolymer.

| COC Blend Composition | Blend Ratio | Comonomer in Polyethylene | Light Transmittance (%) | Haze (%) |
|---|---|---|---|---|
| Topas 6017/Topas 8007/ Affinity VP8770 | 25/25/50 | Octene | 65 | 85 |
| | 30/20/50 | | 69 | 85 |
| Topas 6017/Topas 8007/ Marlex D350 | 15/15/70 | Hexene | 91 | 69 |
| | 25/25/50 | | 82 | 75 |
| | 35/35/30 | | 89 | 42 |

It should be understood that any ranges or sets of ranges set forth herein includes any and all ranges, combination or subcombination of ranges therein.

While specific embodiments have been illustrated and described, numerous modifications are possible without departing from the spirit of the invention, and the scope of protection is only limited by the scope of the accompanying claims.

What is claimed is:

1. A medical device of a polymer composition comprising:
    a first component obtained by copolymerizing a norbornene monomer and an ethylene monomer, the first component being in an amount from about 1–99% by weight of the composition; and
    a second component of an ethylene and α-olefin copolymer, the α-olefin having 6 carbons, the second component being in an amount from about 99% to about 1% by weight of the composition.

2. The device of claim 1 wherein the first component has from about 20 mole percent to about 75 mole percent of the norbornene monomer.

3. The device of claim 1 wherein the first component has from about 30 to about 60 mole percent norbornene monomer.

4. The polymer device of claim 3 wherein the glass transition temperature of the first component is from about 70° C. to about 130° C.

5. The device of claim 4 wherein the first component is present at least in an amount of about 30% by weight of the composition.

6. The polymer device of claim 1 wherein the second component is obtained using a metallocene catalyst.

7. The polymer device of claim 6 wherein the second component has a density from about 0.870 g/cc to about 0.960 g/cc.

8. The device of claim 1 further comprising a third component of a homopolymer or copolymer obtaining using a monomer selected from the group of cyclic olefin or a bridged polycyclic hydrocarbon.

9. The device of claim 8 wherein the third component is a second norbornene and ethylene copolymer different from the first component.

10. The device of claim 9 wherein the third component has a glass transition temperature higher than about 120° C. and the glass transition temperature of the first component is less than about 120° C.

11. The device of claim 9 wherein the third component is present in an amount from 10% to about 90% by weight of the composition.

12. The device of claim 11 wherein the first component and second component are present in a ratio of from about 2:1 to about 1:2 by weight.

13. A medical device of a polymer composition comprising:
    a first component obtained by copolymerizing a norbornene monomer and an ethylene monomer, the norbornene monomer being present in an amount of at least about 20 mole percent of the copolymer, the first component being present in an amount from about 30% to about 99% by weight of the composition and the first component having a glass transition temperature of less than about 130° C.; and
    a second component of an ethylene and α-olefin copolymer, the α-olefin having 6 carbons, the second component being in an amount from about 70% to about 1% by weight of the composition.

14. The device of claim 13 wherein the second component is obtained using a metallocene catalyst.

15. The device of claim 14 wherein the second component has a density from about 0.870 g/cc to about 0.960 g/cc.

16. The device of claim 15 further comprising a third component of a homopolymer of copolymer obtained using a monomer selected from the group of cyclic olefin or a bridged polycyclic hydrocarbon.

17. The device of claim 16 wherein the third component is a second norbornene and ethylene copolymer different from the first component.

18. The device of claim 17 wherein the third component has a glass transition temperature higher than about 120° C. and the glass transition temperature of the first component is lower than about 120° C.

19. The device of claim 18 wherein the third component is present in an amount from 10% to about 90% by weight of the composition.

20. The device of claim 19 wherein the first component and second component are present in a ratio of from about 2:1 to about 1:2 by weight.

21. A medical device assembly comprising:

a first article of a polymer composition comprising a first component obtained by copolymerizing a norbornene monomer and an ethylene monomer, the norbornene monomer being present in an amount of at least about 20 mole percent of the copolymer, the first component being present in an amount from about 30% to about 99% by weight of the composition; and a second component of an ethylene and α-olefin copolymer, the α-olefin having 6 carbons, the second component being in an amount from about 70% to about 1% by weight of the composition;

a second article of a material selected from the group comprising low crystallinity polymers; and wherein the first article is connected to the second article by solvent bonding.

22. The assembly of claim 21 wherein the low crystallinity polymers are selected from the group consisting of cyclic olefin polymers, bridged polycyclic hydrocarbon polymers, blends of cyclic olefins polymers, blends of bridged polycyclic hydrocarbon polymers, polyolefins having a modulus of elasticity of less than 20,000 psi when measured in accordance with ASTM D790, and styrene containing polymers.

23. The assembly of claim 22 wherein the polyolefin is selected from the group comprising homopolymers and copolymers of ethylene, propylene, butene, pentene, hexene, heptene, octene, nonenene, and decene.

24. The device of claim 21 wherein the second component is obtained using a metallocene catalyst.

25. The device of claim 24 wherein the second component has a density from about 0.870 g/cc to about 0.960 g/cc.

26. The device of claim 21 wherein the first article further comprises a third component of a homopolymer or copolymer obtaining using a monomer selected from the group of cyclic olefin or a bridged polycyclic hydrocarbon.

27. The device of claim 26 wherein the third component is a second norbornene and ethylene copolymer different from the first component.

28. The device of claim 27 wherein the third component has a glass transition temperature higher than about 120° C. and the first component has a glass transition temperature lower than about 120° C.

29. The device of claim 28 wherein the third component is present in an amount from 10% to about 90% by weight of the composition.

30. The device of claim 29 wherein the first component and second component are present in a ratio of from about 2:1 to about 1:2 by weight.

31. The device of claim 21 wherein the first article is a medical housing.

32. The device of claim 31 wherein the second article is a medical tubing.

33. A medical device assembly comprising:

a housing of a polymer composition comprising a first component obtained by copolymerizing a norbornene monomer and an ethylene monomer, the norbornene monomer being present in an amount of at least about 20 mole percent of the copolymer, the first component being present in an amount from about 30% to about 99% by weight of the composition; and a second component of a first ethylene and α-olefin copolymer, the first α-olefin having 6 carbons, the second component being in an amount from about 70% to about 1% by weight of the composition; and a flexible tubing of a polyolefin connected to the housing.

34. The device of claim 33 wherein the housing has a modulus of elasticity of greater than about 20,000 psi.

35. The device of claim 34 wherein the polyolefin is selected from the group consisting of homopolymers and copolymers of ethylene, propylene, butene, pentene, hexene, heptene, octene, nonenene, and decene.

36. The device of claim 35 wherein the polyolefin is (a) an ethylene copolymerized with a monomer selected from the group consisting of α-olefins having 3–10 carbons, lower alkyl and lower alkene substituted carboxylic acids and ester and anhydride derivatives thereof, (b) ethylene propylene rubbers, (c) EPDM and (d) ionomers.

37. The device of claim 36 wherein the polyolefin is a second ethylene and α-olefin copolymer wherein the α-olefin has from 3 to 10 carbons.

38. The device of claim 36 wherein the polyolefin is an ethylene copolymerized with comonomers selected from the group of vinyl acetates, vinyl acrylates, methacrylates, methyl methacrylates, acrylic acids, methyl acrylic acids, ethyl acrylates, and ethyl acrylic acids.

39. The device of claim 37 wherein the second ethylene and α-olefin copolymer is obtained utilizing a metallocene catalyst.

40. The device of claim 36 wherein the housing is selected from the group consisting of Y-sites, filter housings, drip chambers, heparin locks, injection sites, catheters, spikes, syringe barrels, closures, oxygenators, and pump cassettes.

* * * * *